United States Patent [19]

Fought

[11] Patent Number: 4,705,295
[45] Date of Patent: Nov. 10, 1987

[54] MATERIAL HANDLING VEHICLE STABILIZER

[75] Inventor: Gerald E. Fought, Sugarcreek, Ohio

[73] Assignee: The Gradall Company, New Philadelphia, Ohio

[21] Appl. No.: 807,617

[22] Filed: Dec. 11, 1985

[51] Int. Cl.$^4$ .............................................. B66C 23/62
[52] U.S. Cl. ................................... 280/754; 212/189; 298/17 S
[58] Field of Search ..................... 280/763.1, 754, 714, 280/6 R, 6 H; 298/17 S, 17 SG; 212/189

[56] References Cited

U.S. PATENT DOCUMENTS

| | | | |
|---|---|---|---|
| 3,191,954 | 6/1965 | Schuetz | 280/6 H |
| 3,559,776 | 2/1971 | Schultze | 188/299 |
| 3,643,970 | 2/1972 | Gauchet | 280/709 |
| 3,687,227 | 8/1972 | Reuter et al. | 280/112 R |
| 4,152,004 | 5/1979 | Schroder | 280/6 H |
| 4,264,014 | 4/1981 | Hogg et al. | 280/754 |
| 4,344,497 | 8/1982 | Rathi et al. | 280/6 H |
| 4,375,903 | 3/1983 | Lovell | 298/17 S |
| 4,382,604 | 5/1983 | Nakagawa | 280/714 |
| 4,512,589 | 4/1985 | Ambrose et al. | 280/6 R |

*Primary Examiner*—John J. Love
*Assistant Examiner*—Ross Weaver

*Attorney, Agent, or Firm*—Kirkpatrick & Lockhart

[57] ABSTRACT

Apparatus for stabilizing a material handling vehicle during implement manipulation is provided. Dual hydraulic cylinders are provided on each side of the vehicle intermediate the vehicle's frame and a spring-biased solid axle. A lockout valve having a pneumatically actuated check valve in fluid communication with one-way check valves and flow restriction valves corresponding to each of the upper and lower ports of the respective hydraulic cylinders is mounted on the vehicle's frame and is in fluid communication with a reservoir of hydraulic fluid. When the vehicle is not caused to travel, the pneumatically actuated check valve is closed allowing no hydraulic fluid flow between the ports of the hydraulic cylinders and thereby locking the then-present fluid in each of the chambers of the hydraulic cylinders which prevents the movement of the pistons thereof and, hence, any displacement of the front axle relative to the vehicle frame. When the joystick controlling travel is actuated, a hydraulic signal is generated which is translated into a pneumatic signal effective to open the check valve. The system provided greatly increases vehicle stability during implement manipulation thereby increasing vehicle capacity without necessitating the use of means such as outriggers.

27 Claims, 6 Drawing Figures

MATERIAL HANDLING VEHICLE STABILIZER

Reference is made to the following pending U.S. patent applications which were filed on the same date the instant application was filed, are owned by the assignee of the present application and which relate to inventions which are employed on the same commercial apparatus on which the instant invention is employed: Ser. No. 807,553; Ser. No. 807,573; and Ser. No. 807,616.

BACKGROUND OF THE INVENTION

1. Field of the Invention

The present invention relates to a material handling vehicle, such as an excavator and, in particular, to an apparatus for stabilizing such a vehicle during manipulation of its material handling implement.

2. Description of the Prior Art

Frequently, a heavy duty material handling mechanism such as a crane or excavator is mounted on an upper structure which is pivotally supported on a lower or truck chassis. The truck chassis is capable of being driven over the road or highway under the control of an operator in a main truck cab provided on the truck chassis. The material handling mechanism is supported on the upper structure which is mounted on the truck chassis by means of a swing bearing through which a center pin extends so as to provide relative movability of the upper structure with respect to the truck chassis. An upper structure operator's cab is provided on the upper structure to move with the material handling mechanism. During operation at a contruction site, an operator in the upper structure operator's cab can control movement of the truck chassis and also of the material handling mechanism.

In the case of a material handling vehicle such as an excavator, a telescoping boom means is preferably vertically pivotally mounted on the upper structure with a material handling implement, such as a bucket, attached to the free end of the boom. The boom means is typically capable of being raised or lowered by means of a hydraulic cylinder connected between the boom support cradle and the upper structure. In addition to the extension and raising of the boom, such booms are also often capable of being tiltable about their axis, or, most preferably, from side to side about a pivot axis remote from the boom axis. Also, as indicated above, the upper structure is preferably horizontally pivotable upon the lower chassis in order that materials may be handled at distances remote from the vehicle and located on virtually any side thereof.

A problem which invariably arises in connection with the handling of articles remote from the vehicle is the stabilization of the vehicle during such handling. It is well known that the instability of the vehicle, if not compensated for, markedly reduces the vehicle's loading capacity at virtually all distances and locations therefrom. Such instability can cause vehicles to fail under remote loadings with potentially catastrophic results.

The principal prior art means for stabilizing material handling vehicles includes the provision of outriggers which extend from the four corners of the vehicle. While the outriggers overcome some of the instability problems, they are fraught with difficulties of their own. For example, the additional times required to extend, set and secure the outriggers reduce the operating time available for the vehicle. Further, the additional engineering, manufacturing, and maintenance times required by the provision of outriggers add considerably to those costs of the vehicle's operation. Also, outriggers add to the weight of the vehicle and may even require the provision of additional axles thereby adding further to vehicle cost. In addition, outriggers are proven to destroy the surface of blacktopped areas when used thereon.

An alternative means for stabilizing material handling vehicles has included the provision of hydraulic cylinders between a non-spring suspended axle of the vehicle and its frame along with means for locking the hydraulic fluid in the chambers of the cylinders. The actuation of such a system was usually manual. Further, even if automatic, such systems have been insufficient to provide effective stabilization of vehicles having spring suspended axles or to be automatically controlled by the mere activation of a remote travel controlling joystick. Moreover, even automatic prior systems use hydraulic fluid controls rather than pneumatically controlled means. Known disadvantages to all hydraulic systems include inaccurate control due to viscosity variations with temperature and the added cost of the additional components of hydraulic systems.

The subject invention is directed toward a means for stabilizing a material handling vehicle which overcomes, among others, the above-discussed problems and which provides an effective, efficient and inexpensive means for stabilizing such vehicles without requiring the use of problem-ridden prior art means such as outriggers.

SUMMARY OF THE INVENTION

In accordance with the present invention, there is provided apparatus for stabilizing a material handling vehicle during the manipulation of its material handling implement which may comprise a bucket. The stabilization apparatus automatically provides a positive rigid attachment between the front axle of the vehicle and its chassis during implement manipulation.

Two hydraulic cylinders are provided between the frame of the truck chassis and its spring suspended front axle. A lockout valve is provided intermediate the input ports of the hydraulic chambers of each side of the respective hydraulic cylinders. During normal vehicle travel, the lockout valve allows such chambers to be hydraulically joined thereby allowing hydraulic fluid to pass therebetween, thereby functioning as additional shock absorbers, and no locking function is provided.

The lockout valve includes one-way check valves and flow restriction check valves in fluid communication between a main remotely pneumatically actuatable check valve and the various chambers of the hydraulic cylinders. A remote travel controller such as a joystick is provided to hydraulically control fluid flow to a hydraulic drive means, which flow also controls a pilot valve that is connected to a hydraulic/pneumatic interface valve. The interface valve controls a pneumatic inversion valve in fluid communication with a source of pressurized air to control its delivery to the main check valve. As such, during travel of the vehicle which is remotely controlled by means of the joystick, a hydraulic signal therefrom causes an air signal to be supplied to the inversion valve which halts air flow to, and hence opens, the main check valve which allows free communication between the hydraulic chambers of the cylinders. When the joystick control halts travel the air signal to the inversion valve is halted which allows air flow to the main check valve which causes its locking. Such locking of the main check valve thereby prevents any flow of hydraulic fluid between the respective hydraulic cylinder chambers. This action locks the hydraulic fluid in each of the chambers of the hydraulic cylinders and prevents any movements of the pistons thereof and, hence, any movement of the front axle relative to the vehicle's frame.

Accordingly, the present invention provides solutions to the aforementioned problems connected with material handling vehicles. As this invention provides an effective means of stabilizing the vehicle during implement manipulation, the vehicle's operating capacity is significantly increased. Moreover, the dangers associated with an unstabilized vehicle and the problems attendant with the use of outriggers are avoided by the employment of a most cost efficient device.

These and other details, objects and advantages of the invention will become apparent as the following description of the present preferred embodiment thereof proceeds.

DETAILED DESCRIPTION OF THE PREFERRED EMBODIMENTS

Figure 1:
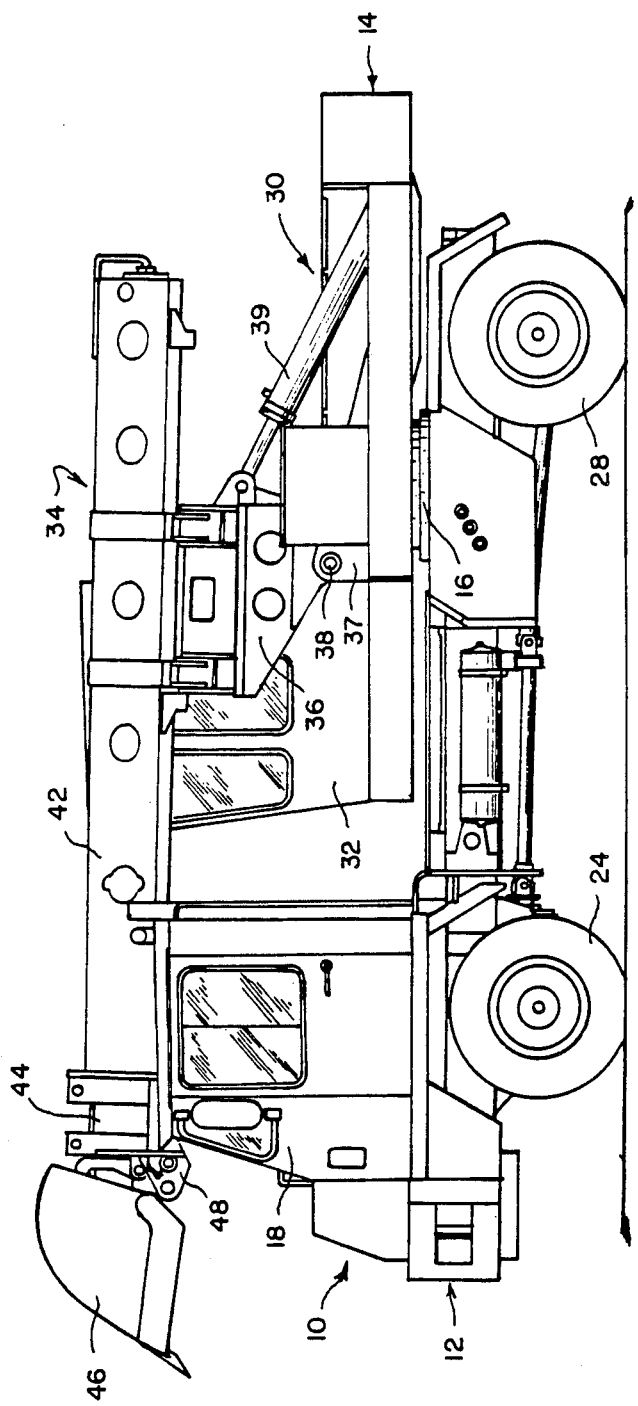
FIG. 1 is a left side view of a truck-mounted extendible boom hydraulic excavator.
Figure 2:
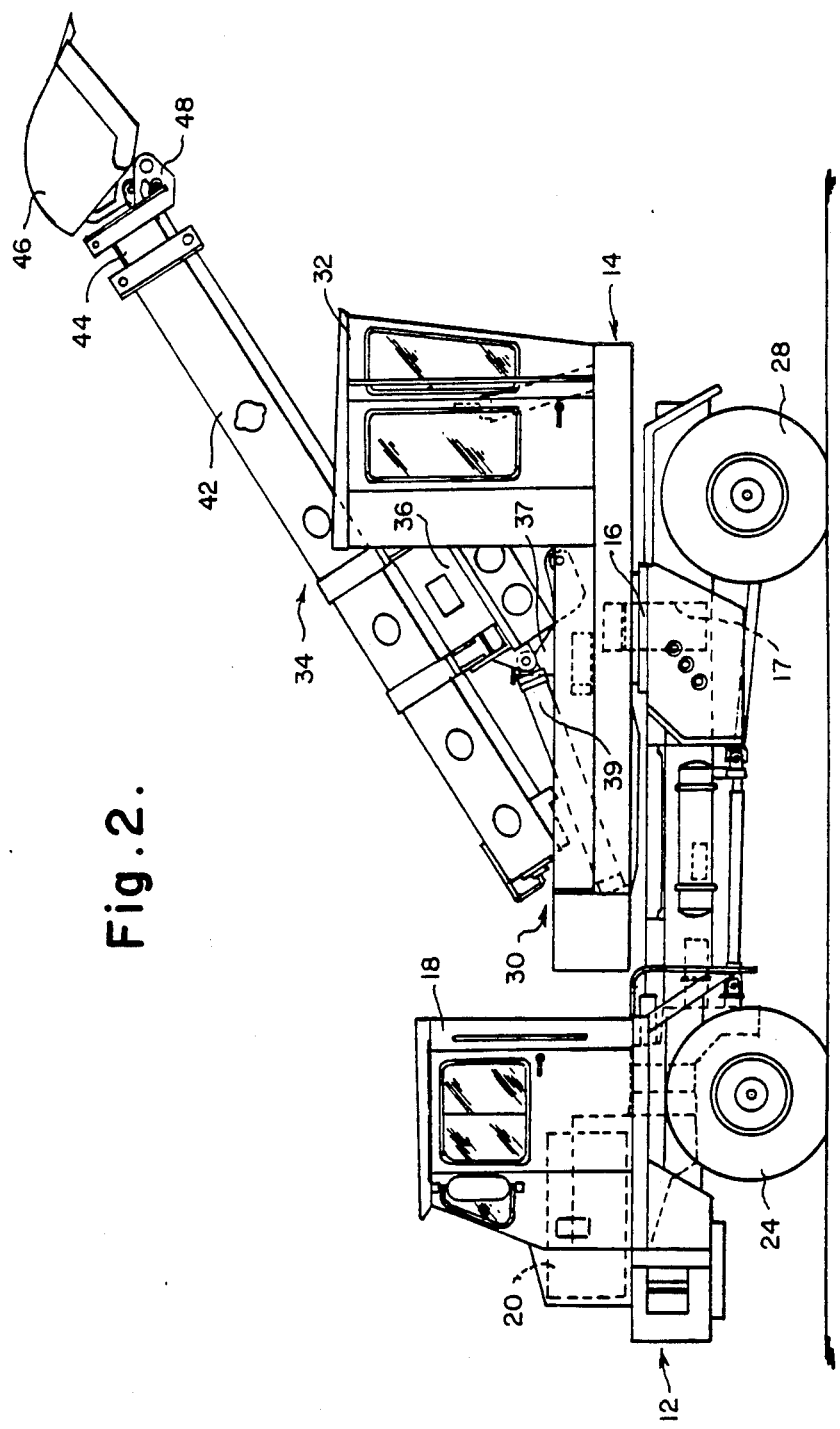
FIG. 2 is a left side elevation view of the excavator of FIG. 1 with the upper structure rotated 180° and the boom raised.
Figure 3:
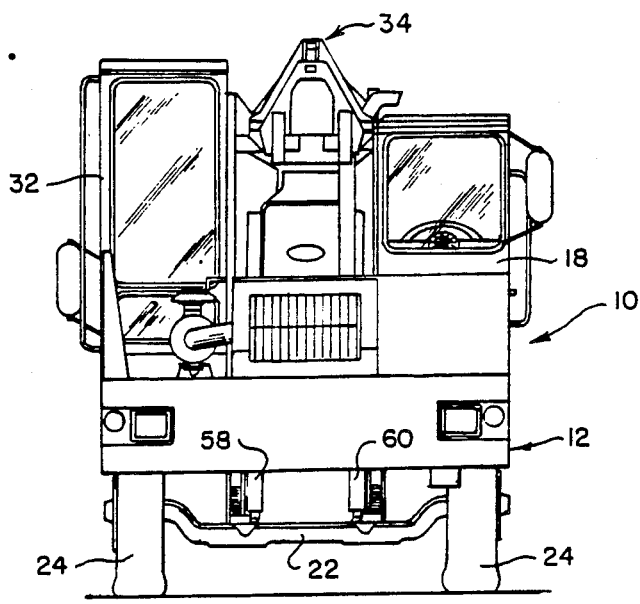
FIG. 3 is a front view of the hydraulic excavator.
Figure 6:
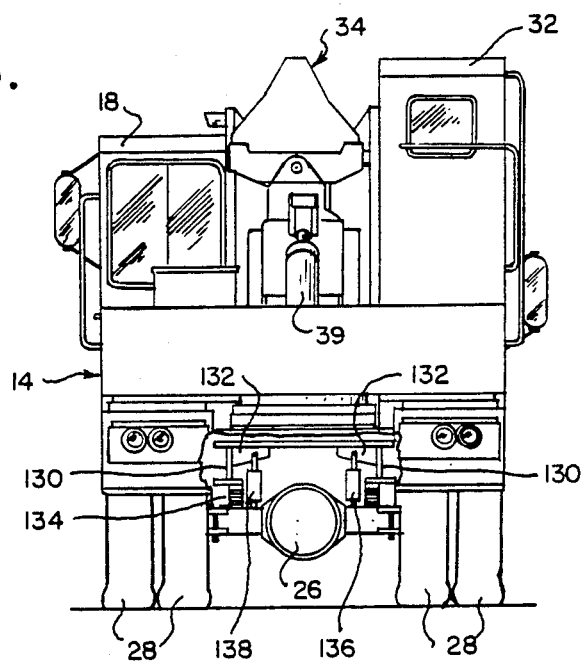

Referring now to the drawings wherein the showings are for purposes of illustrating the present preferred embodiment of the invention only and not for purposes of limiting same, the figures show a mobile material handling vehicle 10 which, for purposes of the present DETAILED DESCRIPTION OF THE PREFERRED EMBODIMENTS, will be described as an extensible boom hydraulic excavating apparatus, also called an excavator.

More particularly and with reference to FIG. 1 there is shown an excavator 10 which includes a lower truck chassis 12 and an upper structure 14 rotatably supported thereon by means of a swing bearing 16 which surrounds a center pin 17. Lower chassis 12 is provided with a truck cab 18 mounted beside an engine 20. A front axle 22 supports the end of lower chassis 12 nearest truck cab 18 on front wheels 24 while a rear axle 26 supports the rear of lower chassis 12 on rear wheels 28.

The upper structure 14 includes an upper platform, generally indicated as 30 on one end of which is mounted a remote operator cab 32. In addition, an extensible boom, generally 34, is mounted to a support cradle 36 which is pivotally attached to an upstanding support 37 of upper platform 30 by means of pins 38 and which allows boom 34 to be vertically pivotable with respect to upper platform 30. Such vertical pivoting of boom 34 is accomplished by means of hydraulic hoist cylinder 39 attached between support cradle 36 and an upstanding support 37 provided on the end of upper platform 30 remote from operator cab 32.

Boom 34 includes a first section 42 which is mounted to support cradle 36 and a second section 44 which is provided to be supportable by and is hydraulically retractable within first section 42. A material handling implement 46, such as a bucket, is preferably movably attached to the free end of second boom section 44 by means of a pivotable support 48. Typical functions of boom 34 and bucket 46 include the raising of boom 34 by means of hydraulic cylinder 39, the extending of second boom section 44 from base boom section 42, the pivoting of boom 34 about a longitudinal axis and the opening of bucket 46. Further, the upper structure 14 may be caused to pivot on lower structure 12.

With respect to the general operation of excavator 10, truck cab 18 is occupied by an operator during over the road or distant movement of the excavator 10 to a selected job site. Operator cab 32 is occupied by the operator around a given job site and when it is desired to manipulate boom 34 or the bucket 46 as described above or to rotate upper structure 14 in a manner known in the art. The movement of lower chassis 12 can be provided by either a two wheel drive system in which only rear wheels 28 are preferably driven or a four wheel drive system in which all wheels 24 and 28 are driven. General operating characteristics and functional capabilities of a material handling apparatus 10 are similar to those disclosed in U.S. Pat. Nos. 3,587,886; 3,599,814 and 3,666,125.

Figure 4:
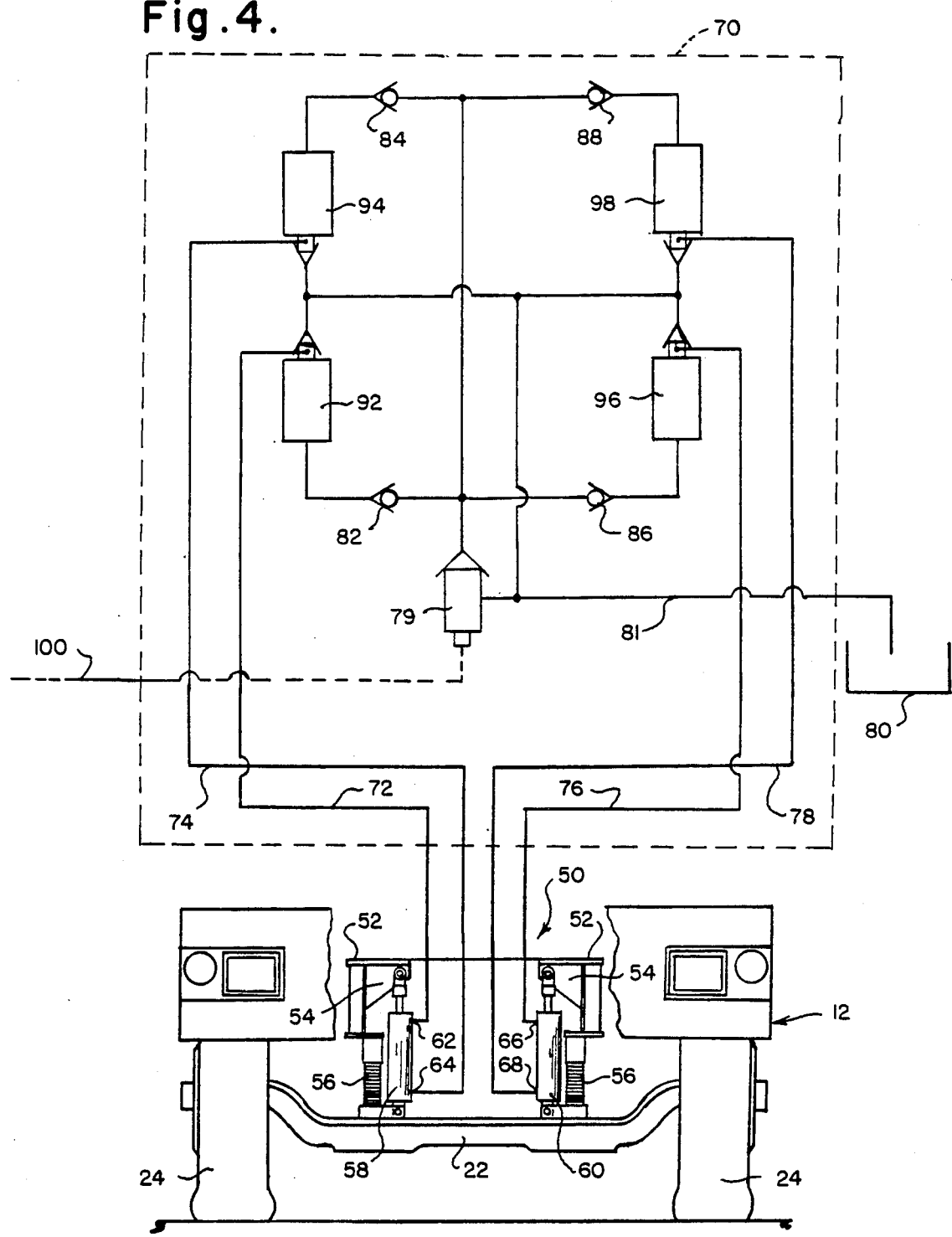
FIG. 4 is a parital front elevation view of an excavator schematically showing certain components of the present invention.
Figure 5:
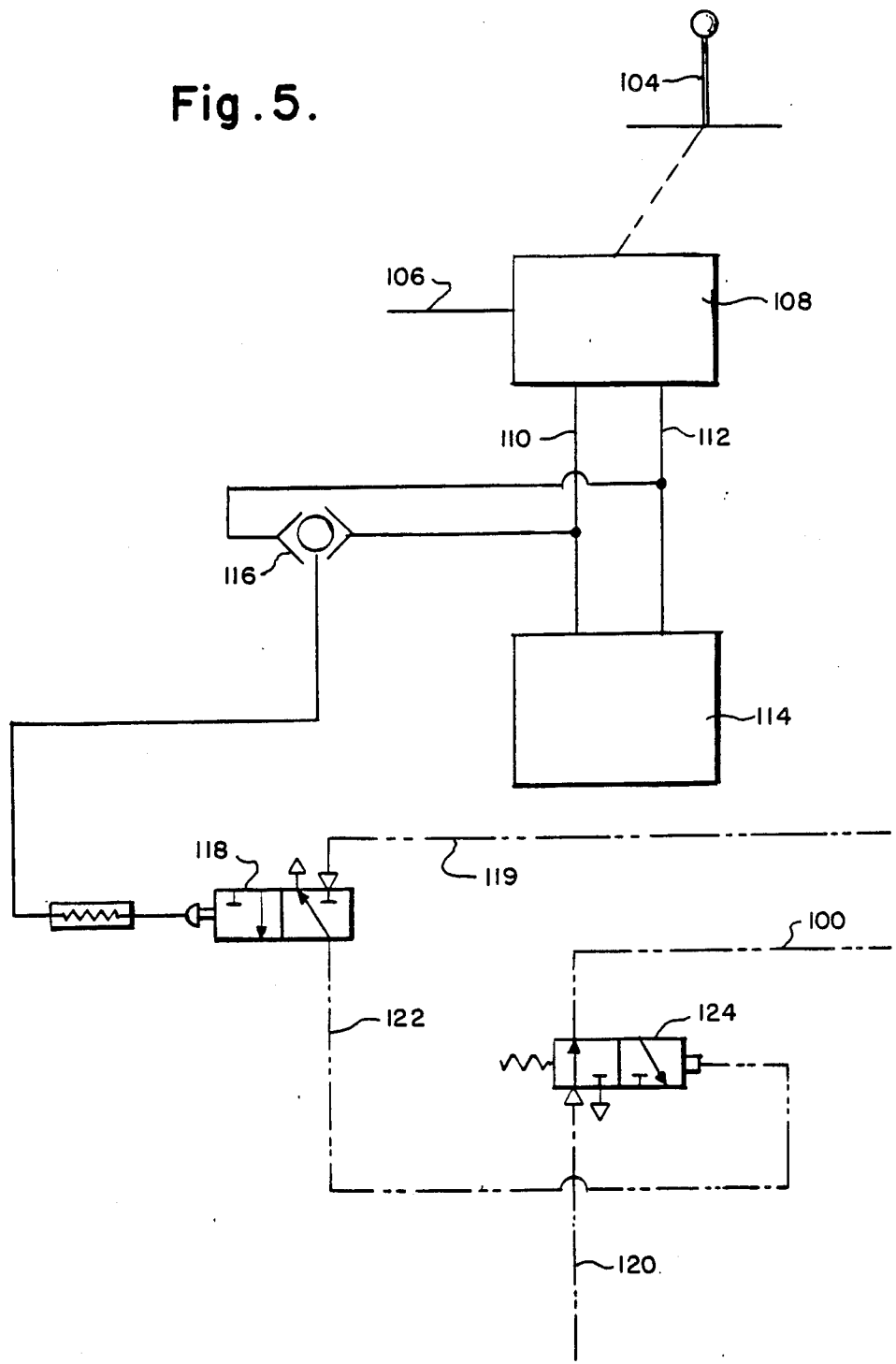
FIG. 5 is a schematic view of components of the control circuit of the present invention; and, FIG. 6 is a rear view of the hydraulic excavator having the stabilization apparatus provided herein.

Referring now to FIG. 4 there is shown the frame 50 of lower truck chassis 12 which may include frontward extending longitudinal "I" beams 52 having brackets 54 extending inwardly therefrom and above front axle 22. Extending between "I" beams 52 and front axle 22 are suspension springs 56. In addition, on the right side of vehicle 10 extending between and pivotally attached to one bracket 54 and front axle 22 is a first hydraulic cylinder 58 while on the driver's side of vehicle 10 a second hydraulic cylinder 60 is pivotally attached to and extends between the other bracket 54 and the other side of axle 22. Double-acting hydraulic cylinder 58 is provided with an upper port 62 and a lower port 64 and double-acting hydraulic cylinder 60 is provided with an upper port 66 and a lower port 68. While the instant invention will be described with reference to a lock-out circuit for the front axle 22 of vehicle 10, it will be understood that the lock-out means provided herein may also be used to stabilize the rear axle of a vehicle 10.

In order to greatly increase vehicle 10 stability during manipulation of an implement 46, a lockout valve 70 mounted on frame 50 functions in cooperation with hydraulic cylinders 58 and 60. In particular, lockout valve 70 is connected to hydraulic cylinders 58 and 60 as follows: by line 72 to port 62, by line 74 to port 64, by line 76 to port 66 and by line 78 to port 68. Briefly summarizing the function of lockout valve 70, when vehicle 10 is in its normal travel mode, the cylinder ports 62, 64, 66 and 68 are effectively joined and connected to the chassis reservoir of hydraulic fluid, shown schematically as 80, thereby allowing hydraulic fluid to flow under the control of orifaces between all chambers of cylinders 58 and 60 thereby performing a shock absorbing function. However, when no movement of vehicle 10 is intended, lockout valve 70 closes to halt any flow of hydraulic fluid between ports 62, 64, 66 and 68, respectively, thereby locking the hydraulic fluid in the respective chambers of cylinders 58 and 60 and preventing any displacement of the pistons thereof, which, in turn, locks front axle 22 relative to frame 50.

Lockout valve 70 is provided with an air actuated check valve 79 the output of which is in fluid communication with reservoir 80 by means of line 81. The input to check valve 79 is connected to the outputs of four one-way check valves 82, 84, 86 and 88, respectively. Further, the inputs of check valves 82, 84, 86 and 88 are connected to the outputs of four spring biased flow restriction check valves 92, 94, 96 and 98, respectively. Flow restriction valves check 92, 94, 96 and 98 are, respectively, in fluid communication with lines 72, 74, 76 and 78. In addition, the inputs to flow restriction check valves 92, 94, 96 and 98 are in fluid communication with one another and are all connected to reservoir line 81.

The activation of air actuated check valve 79 is pneumatically controlled by means of air provided in line 100. The pneumatic signals in air line 100 are controlled along with the control of the remote travel of vehicle 10. The selection of travel or remote modes of operation of vehicle 10 is made in the lower cab 18. When in the remote mode, the upper structure controls may be employed to control vehicle 10 travel and also to control the manipulations of its material handling implement. When in the remote mode, an air signal is generated to control various functions one of which includes locking the holding brakes (not shown) of vehicle 10. As will be explained hereinbelow, air from the holding brake circuit is a convenient source of supply air to control air actuated check valve 79.

As mentioned above, the remote control of vehicle 10 occurs from upper cab 32 which is provided with a joystick 104. Joystick 104 is a mechanical apparatus which controls the flow of hydraulic fluid from a source 106 of pressurized fluid, such as a pump which may be driven by engine 20, to a travel actuator 108. Travel actuator 108 controls the amount of hydraulic fluid flow, if any, from source 106 into either one of two hydraulic lines, 110 or 112 depending on the direction of travel desired. Lines 110 and 112 are in fluid communication with a travel control valve 114 which controls the flow of hydraulic fluid to the remote hydraulic drive means (not shown) of vehicle 10. Hydraulic lines 110 and 112 are both connected to a hydraulic pilot valve 116 which allows hydraulic fluid flow therethrough in the event it senses hydraulic fluid flow in either line 110 or 112. Hydraulic pilot valve 116 is in hydraulic fluid communication with the spool of a spring-biased hydraulic/air interface valve 118. Interface valve 118 is in pneumatic fluid communication with an air signal supply line 119 and is effective to normally prevent an air signal to pass therethrough from air signal supply line 119. However, when a hydraulic pressure emanating from hydraulic pilot valve 116 is present, the spool of interface valve 118 is displaced thereby allowing air flow from line 119 to pass to air line 122. Air line 122 is coupled with an air inversion valve 124 which is spring-biased to normally allow flow from air supply line 120, which may be taken from the holding brake air line, to pass to line 100. As discussed above, the presence of pressurized air in line 100 causes the activation of check valve 79. However, when air is provided via line 122 to inversion valve 124, its spool is displaced thereby preventing air flow to line 100 and, hence, to check valve 79 which causes it to be unlocked thereby freeing the pistons of cylinders 58 and 60.

Accordingly, when the vehicle 10 is in its remote operating mode and joystick 104 is not actuated, inversion valve 124 allows the air supplied by line 120 to pass to check valve 79 thereby locking it. However, when joystick 104 is moved forward or backward, hydraulic fluid is caused to pass in either line 110 or 112 which flow is sensed by pilot valve 116. Pilot valve 116 then displaces the spool of interface valve 118 which prohibits air from line 120 to pass to line 100 which causes the check valve 79 to be opened thereby allowing hydraulic fluid communication between the chambers of hydraulic cylinders 58 and 60.

Returning to the details of the operation of lock-out valve 70, when remote travel of vehicle 10 is undertaken, the joystick 104 is engaged which causes no air signal to be transmitted via air line 100 to check valve 79. In this mode, ports 62, 64, 66 and 68 are in fluid communication with one another and with reservoir 80. As such, hydraulic fluid is able to pass therebetween which allows the pistons of cylinders 58 and 60 to move in response to the relative movements of frame 50 and front axle 22. However, flow restriction check valves 92, 94, 96 and 98 operate to provide additional flow-restricted control of such relative movement and to provide safeguards to the anti-oscillation circuit herein contemplated so as to prevent a sudden, excessive amount of hydraulic fluid from being discharged from chambers 62, 64, 66 or 68, respectively. As such, during vehicle travel flow restriction valves 92, 94, 96, and 98 function to provide additional shock absorbers between front axle 22 and frame 50.

At any time when in the remote mode and the joystick 104 is released, such as when vehicle 10 is moved to a position at which the manipulation of the boom 34 and/or of the implement 46 thereof is to be undertaken, an air signal is delivered via the air inversion valve 124 through air line 100 to air actuated check valve 79. The activation of check valve 79 halts hydraulic fluid flow therethrough which effectively locks in position the hydraulic fluid then within the respective chambers of cylinders 58 and 60. This action is accomplished because no hydraulic fluid is able to pass through main check valve 79 and one way check valves 82, 84, 86 and 88 prevent the free flow of hydraulic fluid back to the lines joining their respective flow restriction valves 92, 94, 96 and 98. By means of example, if an outside force attempted to move the piston in cylinder 58 upward, hydraulic fluid in the upper chamber of piston 58 would attempt to be forced from line 72. However, flow restriction check valve 92 would prevent any flow to the other flow restriction check valves 94,96 and 98, respectively, and while check valve 82 would normally allow flow from line 72, due to the closing of main check valve 79 no fluid can flow therethrough nor can fluid flow against the actions of check valves 84, 86 and 88, respectively.

As such, when main check valve 79 is closed the hydraulic fluid then present in chambers 62, 64, 66, and 68 is locked therein which prevents the movement of the piston of cylinder 58 and 60. As the pistons are locked, there can be no relative movement between axle 22 and frame 50 which effectively creates a rigid connection therebetween effective to stabilize vehicle 10 during manipulation of boom 34 and/or bucket 46. In addition, flow restriction valves 92, 94, 96 and 98 only allow a limited amount of hydraulic fluid to enter the respective chambers of cylinders 58 and 60 to which they are connected to be in fluid communication with reservoir 80 to prevent cavitation in hydraulic cylinders 58 and 60.

As discussed above, a stabilization system may be provided for the rear of excavator 10. In that case, the rear portion of frame 50 may include rearward extending "I" beams 130 having brackets 132 extending inwardly therefrom and above rear axle 26. Extending between brackets 132 and rear axle 26 are rear suspension springs 134. A right rear hydraulic cylinder 136 extends between right bracket 132 and rear axle 26. A left rear hydraulic cylinder 138 extends between left bracket 132 and rear axle 26. A second lockout valve like valve 70 may be provided to control the flow of hydraulic fluid between the chambers of hydraulic cylinders 136 and 138 under the control of control circuitry similar to that provided above.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. Apparatus for stabilizing a vehicle which is provided with a chassis having a supporting frame and an axle suspended from said chassis, comprising:
   a. a first hydraulic cylinder operatively connected between one side of said frame and one side of said axle;
   b. a second hydraulic cylinder operatively connected between the other side of said frame and the other side of said axle;
   c. a pneumatically operated lockout means for sealing hydraulic fluid in all of the chambers of said first and said second hydraulic cylinders upon receipt of a first pneumatic signal and for allowing fluid communication between all of the chambers of said first and second hydraulic cylinders upon the cessation of receipt of said first pneumatic signal;
   d. travel control means for hydraulically powering the movement of said vehicle; and
   e. means coupled to said travel control means for generating said first pneumatic signal when said vehicle is stationary and prohibiting said first pneumatic signal during movement of said vehicle.

2. Apparatus of claim 1 in which said means for generating and prohibiting said first pneumatic signal comprises:
   a. conversion means coupled to said travel control means for generating a control pneumatic signal during movement of said vehicle; and
   b. pneumatic control means coupled to said conversion means for normally generating said first pneumatic signal and for prohibiting said first pneumatic signal upon receipt of said control pneumatic signal.

3. Apparatus of claim 2 in which said pneumatic control means comprises:
   a. a first pneumatic supply line coupled to a first source of pneumatic pressure; and,
   b. inversion valve means coupled to said first pneumatic supply line for normally generating said first pneumatic signal and for prohibiting said first pneumatic signal upon receipt of said control pneumatic signal.

4. Apparatus of claim 3 in which said conversion means comprises:
   a. a hydraulic pilot valve means for generating a hydraulic signal during movement of said vehicle;
   b. a second pneumatic supply line coupled to a second source of pneumatic pressure; and,
   c. interface valve means coupled to said second pneumatic supply line for normally prohibiting pneumatic flow therethrough and for generating said control pneumatic signal upon receipt of said hydraulic signal.

5. Apparatus of claim 4 in which said travel control means comprises:
   a. a source of hydraulic fluid under pressure;
   b. a hydraulic drive means for driving said vehicle when hydraulic fluid is supplied to said hydraulic drive means; and,
   c. a travel actuator means coupled between said source of hydraulic fluid and said hydraulic drive means for controlling the passage of hydraulic fluid from said source of hydraulic fluid to said hydraulic drive means.

6. Apparatus of claim 5 further comprising at least one hydraulic line in fluid communication between said travel actuator means and said hydraulic drive means and between said travel actuator means and said hydraulic pilot valve means.

7. Apparatus of claim 6 in which said hydraulic pilot valve means includes means for generating said hydraulic signal when hydraulic fluid flows from one of said hydraulic lines to said hydraulic drive means.

8. Apparatus of claim 7 further comprising a joystick coupled to said travel actuator means for controlling the passage of hydraulic fluid through said travel actuator means.

9. Apparatus of claim 8 further comprising:
   a. an upper and a lower hydraulic chamber of said first hydraulic cylinder;
   b. an upper and a lower hydraulic chamber of said second hydraulic cylinder;
   c. a first hydraulic line in fluid communication between said lockout means and said upper chamber of said first cylinder;
   d. a second hydraulic line in fluid communication between said lockout means and said lower chamber of said first cylinder;
   e. a third hydraulic line in fluid communication between said lockout means and said upper chamber of said second cylinder; and,
   f. a fourth hydraulic line in fluid communication between said lockout means and said lower chamber of said second cylinder.

10. Apparatus of claim 9 in which said lockout means comprises:
    a. a main hydraulic check valve having a main hydraulic input port, a main hydraulic output port and which is operative upon receipt of said first pneumatic signal to either allow hydraulic fluid flow through said main check valve from said main input port to said main output port or to prohibit hydraulic fluid flow therethrough;
    b. a first one-way check valve configured so as to allow one-way fluid communication from said main output port to said first hydraulic line;
    c. a one-way check valve configured so as to allow fluid communication from said first hydraulic line to said main input port;
    d. a second one-way check valve configured so as to allow fluid communication from said main output port to said second hydraulic line;

e. a one-way check valve configured so as to allow fluid communication from said second hydraulic line to said main input port;

f. a third one-way check valve configured so as to allow fluid communication from said main output port to said third hydraulic line;

g. a one-way check valve configured so as to allow fluid communication from said third hydraulic line to said main input port;

h. a fourth one-way check valve configured so as to allow fluid communication from said main output port to said fourth hydraulic line; and, i. a one-way check valve configured so as to allow fluid communication from said fourth hydraulic line to said main input port.

11. Apparatus of claim 10 further comprising a reservoir of hydraulic fluid in fluid communication with the inputs to said first, second, third and fourth check valves and with the output port of said main check valve.

12. Apparatus of claim 10 in which said first, second, third and fourth check valves are configured so as to allow unrestricted flow into said first, second, third and fourth hydraulic lines and restricted flow to the respective check valves in fluid communication therewith.

13. Apparatus of claim 2 further comprising:
a. an upper and a lower chamber of said first hydraulic cylinder;
b. an upper and a lower hydraulic chamber of said second hydraulic cylinder;
c. a first hydraulic line in fluid communication between said lockout means and said upper chamber of said first cylinder;
d. a second hydraulic line in fluid communication between said lockout means and said lower chamber of said first cylinder;
e. a third hydraulic line in fluid communication between said lockout means and said upper chamber of said second cylinder; and,
f. a fourth hydraulic line in fluid communication between said lockout means and said lower chamber of said second cylinder.

14. Apparatus of claim 13 in which said lockout means comprises:
a. a main hydraulic check valve having a main hydraulic input port, a main hydraulic output port and which is operative upon receipt of said first pneumatic signal to either allow hydraulic fluid flow through said main check valve from said main input port to said main output port or to prohibit hydraulic fluid flow therethrough;
b. a first one-way check valve configured so as to allow one-way fluid communication from said main output port to said first hydraulic line;
c. a one-way check valve configured so as to allow fluid communication from said first hydraulic line to said main input port;
d. a second one-way check valve configured so as to allow fluid communication from said main output port to said second hydraulic line;
e. a one-way check valve configured so as to allow fluid communication from said second hydraulic line to said main input port;
f. a third one-way check valve configured so as to allow fluid communication from said main output port to said third hydraulic line;

g. a one-way check valve configured so as to allow fluid communication from said third hydraulic line to said main input port;

h. a fourth one-way check valve configured so as to allow fluid communication from said main output port to said fourth hydraulic line; and, i. a one-way check valve configured so as to allow fluid communication from said fourth hydraulic line to said main input port.

15. Apparatus of claim 14 further comprising a reservoir of hydraulic fluid in fluid communication with the inputs to said first, second, third and fourth check valves and with the output port of said main check valve.

16. Apparatus of claim 15 in which said first, second, third, and fourth check valves are configured so as to allow unrestricted flow into to said first, second, third and fourth hydraulic lines and restricted flow to the respective check valves in fluid communication therewith.

17. Apparatus of claim 16 in which said pneumatic control means comprises:
a. a first pneumatic supply line coupled to a first source of pneumatic pressure;
b. inversion valve means coupled to said first pneumatic supply line for normally generating said first pneumatic signal and for prohibiting said first pneumatic signal upon receipt of said control pneumatic signal.

18. Apparatus of claim 17 in which said conversion means comprises:
a. a hydraulic pilot valve means for generating a hydraulic signal during movement of said vehicle;
b. a second pneumatic supply line coupled to a second source of pneumatic pressure; and,
c. interface valve means coupled to said second pneumatic supply line for normally prohibiting pneumatic flow therethrough and for generating said control pneumatic signal upon receipt of said control hydraulic signal.

19. Apparatus of claim 18 in which said travel control means comprises:
a. a source of hydraulic fluid under pressure;
b. a hydraulic drive means for driving said vehicle when hydraulic fluid is supplied to said hydraulic drive means; and,
c. a travel actuator means coupled between said source of hydraulic fluid and said hydraulic drive means for controlling the passage of hydraulic fluid from said source of hydraulic fluid to said hydraulic drive means.

20. Apparatus of claim 19 further comprising at least one hydraulic line in fluid communication between said travel actuator means and said hydraulic drive means and between said travel actuator means and said hydraulic pilot valve means.

21. Apparatus of claim 20 in which said hydraulic pilot valve means includes means for generating said hydraulic signal when hydraulic fluid flows from one of said hydraulic lines to said hydraulic drive means.

22. Apparatus of claim 21 further comprising a joystick coupled to said travel actuator means for controlling the passage of hydraulic fluid therethrough.

23. An excavator comprising:
a. a chassis;
b. an upper structure supported by and movable with respect to said chassis and having a material handling device mounted thereon;

c. a front axle extending across said chassis;
d. means disposed between said chassis and said front axle for movably supporting said front axle from said chassis; and,
e. locking means disposed between said front axle and said chassis, operable in a locked mode for preventing relative movement between said chassis and said front axle and a released mode permitting relative movement between said chassis and said front axle said locking means comprising:
  (i) a first hydraulic cylinder operatively connected between one side of said frame and one side of said axle;
  (ii) a second hydraulic cylinder operatively connected between the other side of said frame and the other side of said axle;
  (iii) a pneumatically operated lockout means for sealing hydraulic fluid in all of the chambers of said first and said second hydraulic cylinders upon receipt of a first pneumatic signal and for allowing fluid communication between all of the chambers of said first and second hydraulic cylinders upon the cessation of receipt of said first pneumatic signal;
  (iv) travel control means for hydraulically powering the movement of said vehicle; and
  (v) means coupled to said travel control means for generating said first pneumatic signal when said vehicle is stationary and prohibiting said first pneumatic signal during movement of said vehicle.

24. The excavator of claim 23 in which said means disposed between said chassis and said front axle comprises spring means for resiliently movably supporting said front axle from said chassis.

25. The excavator of claim 23 in which said means for generating and prohibiting said first pneumatic signal comprises:
a. conversion means coupled to said travel control means for generating a control pneumatic signal during movement of said vehicle; and
b. pneumatic control means coupled to said conversion means for normally generating said first pneumatic signal and for prohibiting said first pneumatic signal upon receipt of said control pneumatic signal.

26. The excavator of claim 25 in which said pneumatic control means comprises:
a. a first pneumatic supply line coupled to a first source of pneumatic pressure; and,
b. inversion valve means coupled to said first pneumatic supply line for normally generating said first pneumatic signal and for prohibiting said first pneumatic signal upon receipt of said control pneumatic signal.

27. The excavator of claim 26 in which said conversion means comprises:
a. a hydraulic pilot valve means for generating a hydraulic signal during movement of said vehicle;
b. a second pneumatic supply line coupled to a second source of pneumatic pressure; and,
c. interface valve means coupled to said second pneumatic supply line for normally prohibiting pneumatic flow therethrough and for generating said control penumatic signal upon receipt of said hydraulic signal.

* * * * *

UNITED STATES PATENT AND TRADEMARK OFFICE
CERTIFICATE OF CORRECTION

PATENT NO. : 4,705,295

DATED : November 10, 1987

INVENTOR(S) : Gerald E. Fought

It is certified that error appears in the above-identified patent and that said Letters Patent is hereby corrected as shown below:

Col. 9, line 21, delete "10" and substitute therefor --11--.

Signed and Sealed this

Twenty-sixth Day of April, 1988

Attest:

Attesting Officer

DONALD J. QUIGG

Commissioner of Patents and Trademarks